Patented Mar. 2, 1948

2,436,791

UNITED STATES PATENT OFFICE 2,436,791

TYPOGRAPHIC INK

Frank W. Cray, New York, N. Y., assignor to Interchemical Corporation, New York, N. Y., a corporation of Ohio No Drawing. Application May 31, 1941,
Serial No. 396,187

1 Claim. (Cl. 260—30)

This invention relates to typographic and lithographic printing inks, and is directed particularly to improvements in inks of the so-called heat-set type, my new inks being characterized by the use of resins of a particular solubility range, in combination with a mixture of solvents.

The printing of high-grade periodicals has recently been revolutionized by the introduction of a new type of printing ink, the vehicles of which comprise binders dissolved in organic solvents non-volatile at ordinary room temperatures, but which evaporate rapidly at elevated temperatures; such inks are described and claimed in the Gessler United States Patent No. 2,087,190, issued July 13, 1937. These inks are printed in conventional fashion on typographic presses, and the prints are then passed through ovens in which the temperature is sufficiently high to cause evaporation of the solvent. Preferably, the solvent is burned, as described in the Helmer United States Patent No. 2,127,956, issued August 23, 1939.

Cheaper inks of this type have been made by the use of oleoresinous and resinous binders dissolved in petroleum hydrocarbon solvents of appropriate evaporation characteristics. Provided that relatively narrow cuts are used, such solvents produce satisfactory inks both as to press-stability and drying speed, when used on presses operating at speeds in the range of 500–800 feet per minute. When substantially higher press speeds are used, it becomes necessary to use higher heats in drying ovens than are economical, or to sacrifice some measure of press-stability.

I have discovered that substantially faster drying of inks of this character can be obtained, together with better press-stability, by using as the vehicles of heat-set inks a solution of a resin soluble in petroleum hydrocarbons having a dimethyl sulfate value above about 6.0, and substantially insoluble in petroleum hydrocarbons having a dimethyl sulfate value below about 4.0, in a mixture of a high dimethyl sulfate petroleum hydrocarbon solvent which is relatively non-volatile at room temperature, but which evaporates very readily at elevated temperatures, in combination with a less volatile petroleum hydrocarbon diluent having a dimethyl sulfate value below about 4.0.

The dimethyl sulfate value is determined in standard fashion, as described in Gardner's standard work on "Physical and Chemical Examination of Paints, Varnishes, Lacquers and Colors," 9th edition, May, 1939, at page 418.

The more volatile powerful solvent should have sufficient press-stability so that it will not evaporate too rapidly, but should be readily volatile at the drying temperatures. In general, the volatility of the solvents, since they are of a single class, can be determined by their boiling ranges. Roughly, these solvents should not be more volatile than a solvent of this class having a 5–95% boiling range of 220–250° C., nor less volatile than one having a 5–95% boiling range of 275–300° C.

The less volatile diluents should evaporate substantially less rapidly than the solvent, but should be evaporable at 150° C. with some ease. Petroleum distillates having a 5–95% range of as low as 230–260° C. may be used in conjunction with the most volatile solvents, and yield an improvement in press-stability; but I prefer to use substantially more press-stable diluents. The upper range of distillation is about 320–350° C.; above this range, the diluent is so non-volatile that it interferes seriously with the drying of the ink.

I have made comparative tests of inks made entirely with a high solvency solvent, and with a mixture in accordance with my invention of the same overall evaporation rate. Even when as little as 20% of the total solvent mixture is a diluent, a marked increase in drying speed is apparent, without any loss in press-stability. That is, I believe, due to the fact that on the press, at ordinary temperatures, the drying rate of all the solvent is so slow that the solvent-diluent balance is not impaired; on heating, the evaporation rate becomes rapid enough to effect a selective evaporation which leaves a mixture richer in diluent, so that the ink becomes solid with much more of the petroleum hydrocarbon remaining behind than when straight solvent is used.

The total of diluent should not exceed about 80% of the total solvent; if the solvent gets below this figure, difficulty is encountered with press-stability.

The invention is also useful where it is desirable to increase the press-stability of an ink while retaining its drying speed.

A typical example of my invention is the following:

| | Parts |
|---|---|
| Carbon black | 19 |
| Cocoa butter | 1 |
| Talc | 2 |
| Prussian blue in linseed oil (50%) | 4 |
| Alkali blue in linseed oil (40%) | 4 | are dispersed in a mixture of

| | Parts |
|---|---|
| Varnish | 63 |
| High solvency petroleum solvent #1 (dimethyl sulfate, 8 boiling range (5-95%) 260-280° C.) | 2 |
| #5 Litho varnish (bodied linseed oil) | 5 |
| Lecithin | 2 |

The varnish consisted of

| | Parts |
|---|---|
| Phenol-formaldehyde resin-ester gum modified-soluble in high solvency petroleum solvents—insoluble in low (Amberol F-7) | 40 |
| High solvency petroleum solvent #1 as above | 20 |
| High solvency petroleum solvent #2 (dimethyl sulfate 10 boiling range (5-95%) 230-260° C.) | 10 |
| Petroleum diluent (dimethyl sulfate 3 to 4 boiling range (5-95%) 275-305° C.) | 30 |

This was compared with a similar ink of almost identical press-stability, using the same ingredients, but with the solvent used being only the high solvency petroleum solvent #1. There was a marked difference in speed of drying, dry prints being obtained with my ink in about two-thirds the time of the conventional ink.

While the difference between a dimethyl sulfate value of below 4 and above 6 does not seem great, there appears to be a line of demarcation somewhere between the two figures which sharply separates the two groups of solvents as to their solvent action on many resins. It is noteworthy that unless specially treated, petroleum distillates of the boiling ranges used (specially cut higher kerosenes and up) all have the higher dimethyl sulfate values; the purification needed to reduce this value to below 4.0 may account for the sharp difference in solvency.

The solubility of the resin as described herein refers to solubility on cold cutting. Most resins, when melted with equal weights of the diluents will blend with them but on cooling the mixtures will set up to hard solid masses; whereas a similar blend with solvents capable of dissolving the resins in the cold will be rather thin liquids.

Satisfactory resins include phenol aldehyde and modified phenol aldehyde resins having the correct solubility, alkyd resins modified with such quantities of monobasic acids as to have the required solubility, certain cumar resins and the like.

The inks may be made with any of the conventional pigments and addition agents ordinarily used, the important ingredients being a resin of the correct solubility in sufficient proportion to give the desired body, and a mixed solvent comprising from 20–80% of a solvent as defined, and from 80–20% of a diluent as defined.

I claim:

A typographic printing ink comprising pigment dispersed in a varnish consisting essentially of a phenol-formaldehyde resin soluble in difficultly volatile petroleum distillates having dimethyl sulfate values of above 6.0 and substantially insoluble in such distillates having dimethyl sulfate values below about 4.0, in sufficient ratio to the solvent used to yield an ink of desired consistency, and a solvent consisting of from 20–80% of a petroleum distillate solvent evaporating at a rate represented by a 5–95% distillation range between 220–250° C. and 275–300° C., and having a dimethyl sulfate value above about 6.0, and from 80–20% of a petroleum distillate diluent evaporating at a rate represented by a 5–95% distillation range between 230–260° C. and 320–350° C. and having a dimethyl sulfate value below about 4.0 the low dimethyl sulfate solvent having a substantially higher distillation range than the high dimethyl sulfate solvent.

FRANK W. CRAY.

REFERENCES CITED

The following references are of record in the file of this patent:

UNITED STATES PATENTS

| Number | Name | Date |
|---|---|---|
| 1,439,696 | Doughty | Dec. 26, 1922 |
| 2,018,557 | Hopkins | Oct. 22, 1935 |
| 2,073,229 | Shuey | Mar. 9, 1937 |
| 2,252,917 | Curado | Aug. 19, 1941 |
| 1,942,757 | Iliff | Jan. 9, 1934 |
| 2,068,834 | Winning | Jan. 26, 1937 |
| 2,325,297 | Barmeier | July 27, 1943 |